(No Model.)  2 Sheets—Sheet 1.
S. JENKS.
CHEESE MAKING APPARATUS.
No. 267,211. Patented Nov. 7, 1882.
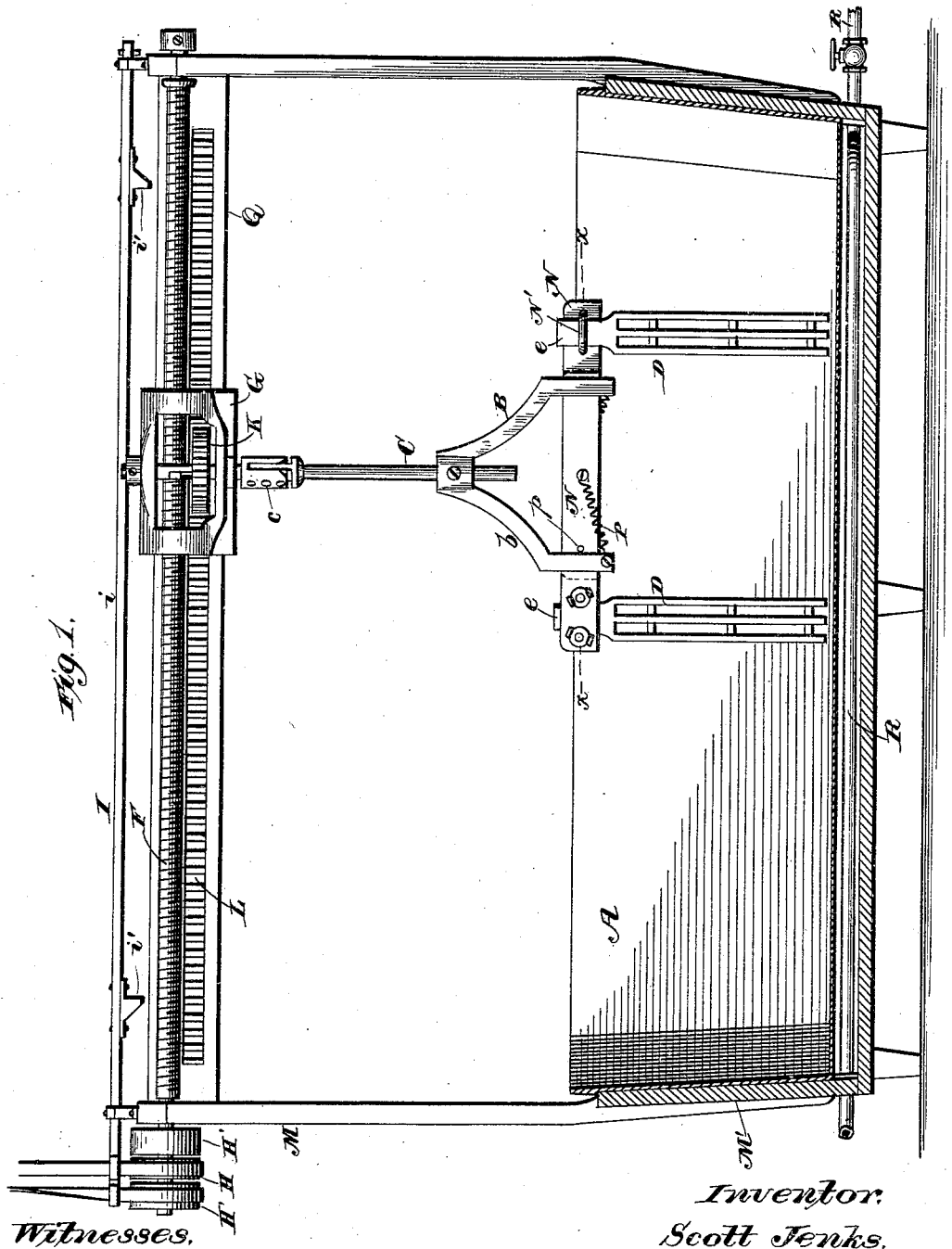
Witnesses,
Robert Everett
J. A. Rutherford
Inventor.
Scott Jenks.
By James L. Norris.
Atty.

(No Model.) 2 Sheets—Sheet 2.
S. JENKS.
CHEESE MAKING APPARATUS.
No. 267,211. Patented Nov. 7, 1882.
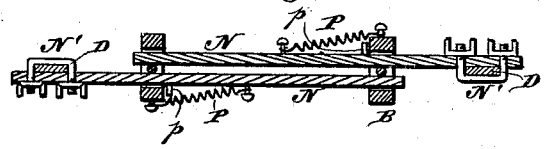
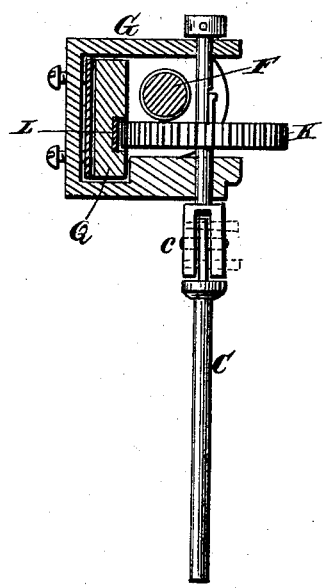
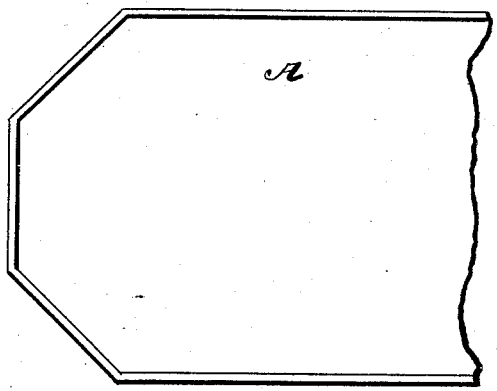
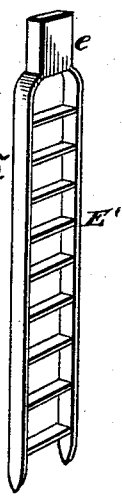
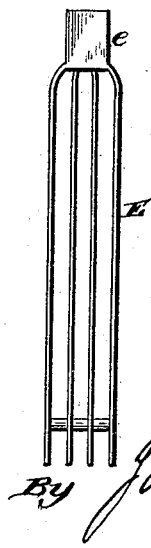
Witnesses.
Robert Everett
J. A. Rutherford
Inventor.
Scott Jenks.
By James L. Norris.
Atty.

UNITED STATES PATENT OFFICE.

SCOTT JENKS, OF CHESHIRE, MASSACHUSETTS, ASSIGNOR OF ONE-HALF TO CHARLES MILLAR AND HENRY W. MILLAR, BOTH OF UTICA, N. Y.

CHEESE-MAKING APPARATUS.

SPECIFICATION forming part of Letters Patent No. 267,211, dated November 7, 1882.

Application filed August 19, 1882. (No model.)

*To all whom it may concern:*

Be it known that I, SCOTT JENKS, a citizen of the United States, residing at Cheshire, in the county of Berkshire and State of Massachusetts, have invented new and useful Improvements in Apparatus for Making Cheese, of which the following is a specification.

This invention relates to an apparatus for preparing and cutting curd in cheese-making. The objects of my invention are to impart to both the agitators and the curd-cutters, which are successively used for preparing and cutting the curd, a revolving and at the same time a horizontal reciprocating movement, so that as they revolve they shall be carried from end to end of the vat. A further object is to provide certain novel means for effecting such movements on the part of the agitators and curd-cutters. These objects I attain by the devices illustrated in the annexed drawings, in which—

Figure 1 is a side elevation of my improved apparatus with the vat in section. Fig. 2 shows a section through the carrier for the agitators and cutters, taken on the line $x\,x$, Fig. 1. Fig. 3 is a transverse section through the carriage and certain adjuncts. Fig. 4 shows a top view of one end of the vat with corners beveled. Fig. 5 illustrates the horizontal and Fig. 6 the vertical form of curd-cutter.

A indicates an oblong vat for containing the milk to be curdled. The agitators and cutters which are employed for preparing and cutting the curd are suspended within the vat by a carrier, B, which is adjustably held upon a rotary suspension rod or shaft, C, and caused both to reciprocate horizontally or move back and forth from end to end of the vat, and to rotate about a vertical axis simultaneously with its reciprocating movement. This rotary and reciprocating carrier is adapted to hold the agitators D, which are primarily employed in stirring up the warm milk and rennet or other substance employed for curdling the milk. The vertical and horizontal curd-cutters E and E' are also adapted to be held by the means used for holding the agitators, and will be brought into use when required to cut the curd, the agitators again being used to stir the curd which is being cooked, to maintain an even temperature throughout the vat. The horizontal reciprocatory movement of the head carrying the agitators and curd-cutters is effected by means of an elevated endless screw, F, arranged above the vat. This endless screw propels a carriage, G, which travels upon a suitable guide, and is provided with bearings for the upper end of the rotary suspension rod or shaft C. As a simple and efficient means for rotating the endless screw, and also for reversing the motion when the agitators or curd-cutters arrive at either end of the vat, I provide upon one end of the screw three belt-pulleys, the middle one, H, of which is fixed, while the remaining pulleys, H', run loose upon an unthreaded portion of the screw-shaft. Power can be applied by means of a straight and a crossed belt, which are alternately thrown upon the fixed pulley by a belt-shifter, I, having a slide-rod, $i$, extending the length of the screw, and provided near each end with a dog, $i'$, adapted to be struck by the carriage when the latter has traveled the distance required to bring the agitators or curd-cutters up to the end of the vat. This action of the carriage against either one of the dogs actuates the belt-shifter, so as to throw one belt off from and the other belt onto the fixed pulley, thus reversing the motion of the screw and effecting a reverse movement on the part of the carriage. It will be readily understood that there are other well-known means for providing for this change of motion, which I claim to have the right to use in place of the above, should it be deemed best.

The means for imparting a rotary movement to the suspension rod or shaft C, so as to revolve the head which carries the cutters or agitators, consists of a pinion, K, fixed upon said shaft and engaging a stationary horizontal rack-bar, L. Hence as the carriage is propelled by the screw the rack-teeth will cause the pinion to rotate, and thereby rotate the shaft C and revolve the head carrying the agitators or cutters, as the case may be.

The endless screw can be mounted in hangers suspended from the ceiling, or a suitable elevated frame or beam; or it can, as herein represented, have its bearings in standards M, which rise from a casing, M', adapted to receive the vat.

The rotary and reciprocating head, which it is obvious can be constructed in a variety of ways, is herein shown as comprising a yoke, b, adjustably secured upon the shaft C, and having its lower ends adapted to support loosely a pair of slide-bars, N, provided at their ends with adjustable clips N' for holding the agitators or curd-cutters. The ends of the bars carrying the clips or other suitable holders are normally projected out to a limited extent from the yoke by means of springs P, connected with the bars and the arms of the yoke, the extent to which said bars are projected being limited by suitable stops, p. The bar will thus yield to pressure against their outer ends, whereby should either the bars or the agitators or curd-cutters strike the vat during operation there will be no liability of damage to either of said members. The shaft C is preferably jointed at a point below the carriage, as at c, so as to allow the yoke B and spindle C to be turned up out of the way when not in use, or to be detached and removed when desired.

The carriage is shown composed of a hollow casting fitted to slide upon a horizontal rail, Q, supported by the standards M, and the said rail is utilized as a support for the rack-bar; but it will be obvious that the means of support, both for the endless screw and for the rack-bar, could be considerably varied without departing from my invention.

In preparing the curd the milk will be first warmed or heated within the vat by steam-pipes R, passing under its bottom, and the milk, with rennet or other suitable substance, stirred by the agitators E, which are shown as composed of a series of parallel strips or bars connected at intervals by transverse pins, and united at one end to a handle, e, which is adapted to be clasped by the clip N'. Any other desired form may be used for these agitators without affecting my invention.

In cutting the curd so as to separate it from the whey both forms of the curd-cutters shown can be employed, one or more being secured to each bar N. The vertical cutter E comprises a series of parallel vertical blades united at one end to a common handle, while the horizontal curd-cutter consists of a series of horizontal blades secured to two parallel vertical strips, which are at one end secured to a handle, as illustrated. It will also be observed that other forms of agitators and curd-cutters from those shown can be employed, and I do not confine myself to the particular construction herein illustrated.

From the foregoing it will be seen that when the endless screw is made to rotate the carriage G is moved forward or back and causes the carrier B to revolve. When the latter reaches one end of the vat the carriage itself reverses the motion of the screw by striking the dog i', and thereby actuating the belt-shipper, which reverses the motion of the screw, and also of the carrier B. This movement from end to end of the vat, with its continual change of the rotary motion at each trip, will be maintained as long as the mechanism is operated, and as the curd-cutters or curd-agitators partake of the same movement as the carrier B their action will be continuous, rapid, and effective. The change of motion is desirable on many accounts, as, if the vat is nearly full, it avoids all danger of throwing out a portion of its contents, which might be the result if the agitators revolved one way only.

When the vat is made square at its ends it may become necessary to dislodge by hand the curd settling in the corners, so as to bring it under the action of the cutters; but by forming the vat with round corners or with the corners cut off, as shown in Fig. 4, such hand operation is avoided.

It is obvious that other known means besides the endless screw may be employed to secure the horizontal or reciprocating motion, and in connection with the rack-bar and pinion or its equivalent produce the revolution of the vertical axis C.

I do not propose to confine myself to the special construction shown, since other forms may be found more desirable for producing the same movements.

Having thus described my invention, what I claim is—

1. In an apparatus for preparing, cutting, or agitating curd in the art of making cheese, the combination of a vertical rod or shaft, carrying at its lower portion a depending agitator or cutter for agitating or cutting the curd, with means for supporting and reciprocating the rod or shaft in a longitudinal plane, and means for rotating the shaft, and thereby imparting to the agitator or cutter a rotary motion in a horizontal plane about the vertical rod or shaft as the latter is reciprocated, substantially as described.

2. An apparatus for preparing, cutting, or agitating curd in the art of making cheese, combining in its structure a vertical suspension rod or shaft provided at its lower end with a carrier, a curd cutter or agitator suspended from the carrier and adapted to be immersed in the curd contained in a vat, and mechanism for reciprocating the carrier longitudinally, and at the same time imparting thereto a rotating movement in a horizontal plane about the suspension rod or shaft, substantially as described.

3. The combination, in an apparatus for preparing, cutting, or agitating curd in cheese-making, of a carrier for the agitators or curd-knives, with an endless screw which causes a reciprocating movement on the part of the carrier, and a rack and pinion which imparts a rotary movement to the carrier-shaft and the carrier simultaneously with its reciprocating movement, as set forth.

4. The combination, in an apparatus for preparing, cutting, or agitating curd in cheese-making, of a rotary carrier for the agitators or the curd-cutters, with a carriage which supports the carrier-shaft, an endless screw for propelling the said carriage, and a rack which is engaged by a pinion upon the carrier-shaft for imparting a rotary motion to the carrier, substantially as described.

5. The combination, in an apparatus for preparing, cutting, or agitating curd in cheese-making, of a rotary carrier for the agitators or the curd-knives, with an endless screw or its equivalent, which propels a carriage from which the carrier is suspended, means, substantially as described, for imparting to the carrier a rotary motion, and a belt-shifter which is acted upon by the carriage at both terminals of its line of travel, so as to automatically reverse the motion of the screw, and thereby cause a reciprocating movement on the part of the carriage and a reverse revolution of the carrier, as set forth.

6. In an apparatus for preparing, cutting, or agitating curd in cheese-making, one or more bars or supports by which the curd cutters or agitators are carried, said bar or bars being mounted in a rotary carrier, B, in combination with springs P, or their equivalent, substantially as described.

7. The combination, in an apparatus for preparing, cutting, or agitating curd, of cutters or agitators, mounted on a traveling and rotary carrier, with mechanism for automatically reversing the movement and the rotation of said cutters or agitators as the carrier arrives at each end of the vat, substantially as described.

In testimony whereof I have hereunto set my hand and seal in the presence of two subscribing witnesses.

SCOTT JENKS. [L. S.]

Witnesses:
  HENRY J. BLISS,
  F. F. SPOONER.